United States Patent
Oyori et al.

(10) Patent No.: US 9,260,195 B2
(45) Date of Patent: Feb. 16, 2016

(54) ELECTRICITY GENERATION SYSTEM (71) Applicant: IHI AEROSPACE CO., LTD., Tokyo (JP)

(72) Inventors: Hitoshi Oyori, Tokyo (JP); Noriko Morioka, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 265 days.

(21) Appl. No.: 13/870,935

(22) Filed: Apr. 25, 2013

(65) Prior Publication Data
US 2015/0100180 A1 Apr. 9, 2015

(30) Foreign Application Priority Data
Apr. 27, 2012 (JP) .................................. 2012-102656

(51) Int. Cl.
| F02C 3/113 | (2006.01) |
| F02C 7/36 | (2006.01) |
| F01D 15/10 | (2006.01) |
| B64D 41/00 | (2006.01) |
| B60R 16/03 | (2006.01) |

(52) U.S. Cl.
CPC ................ *B64D 41/00* (2013.01); *B60R 16/03* (2013.01); *F01D 15/10* (2013.01); *F02C 3/113* (2013.01); *F02C 7/36* (2013.01); *F05D 2270/101* (2013.01)

(58) Field of Classification Search
None
See application file for complete search history.

(56) References Cited

FOREIGN PATENT DOCUMENTS

JP 2002-070585 A 3/2002

OTHER PUBLICATIONS

Maldonado, M., Shah, N., Cleek, K., Walia, P., Korba, G. (1996). Power Manegement and Distribution System for a More Electric Aircraft (MADMEL)—Program Status. US Airforce, Northrop/Grumman Corporation and Lockheed Martin.*

Zahringer et al., "Towards the Powerhouse for More Electric Aircraft-Dedicated Engine Concepts," The American Institute of Aeronautics and Astronautics, 2009.

* cited by examiner

*Primary Examiner* — Mussa A Shaawat
*Assistant Examiner* — Abdhesh Jha
(74) *Attorney, Agent, or Firm* — Marshall, Gerstein & Borun LLP (57) ABSTRACT

An electricity generation system according to the present invention comprises a first electric generator designed to generate electricity by rotation of a high-pressure shaft of a compressor constituting a jet engine, a second electric generator designed to generate electricity by rotation of a low-pressure shaft of the compressor, a power distributor for distributing power generated by the first and second electric generators among a multiple loads, a first power regulation device for regulating power output of the first electric generator, a second power regulation device for regulating power output of the second electric generator, and a power control device which manipulates the first and second power regulation devices to ensure a specified amount or greater of jet engine surge margin.

7 Claims, 5 Drawing Sheets

ELECTRICITY GENERATION SYSTEM

BACKGROUND OF THE INVENTION

1. Field of the Invention

The present invention relates to an electricity generation system for an aircraft or the like equipped with a jet engine.

2. Description of the Related Art

Jet engines including a compressor are known as propulsion devices for aircraft and the like. In the aircraft or the like equipped with this type of jet engine, a fuel pump, a hydraulic pump, a lubricant pump and other devices equipped to the jet engine are commonly driven by a rotating high-pressure shaft of the compressor, via an accessory gearbox, while electric power required for the aircraft or the like is commonly supplied from an electric generator driven by the rotating high-pressure shaft of the compressor, via the accessory gearbox. The configuration that the mechanical pumps as well as the electric generator is driven by the high-pressure shaft of the compressor has a problem such that an increase in power consumption in the aircraft or the like increases a load on the high-pressure shaft of the compressor, which leads to reduced surge margin, and thus, increased possibility of surge (see JP 2002-70585 A). Particularly with a great increase in power demand in aircraft and the like in recent years, reduction of surge margin has becoming a problem. Here, the "surge" means a phenomenon that the jet engine does not operate properly due to stall of the compressor or the like. The "surge margin" is a measure of how close an operating point is to surge, and corresponds to a region between the operating line and the surge line on the map of low-pressure compression part entry air flow rate versus pressure ratio of the compressor.

To deal with the above problem, an electricity generation system configured to generate electricity by being driven by both the high-pressure shaft and the low-pressure shaft of the compressor has been proposed (see non-patent document: Christian Zaehringer and two others, "Towards the Powerhouse for More Electric Aircraft Dedicated Engine Concepts", http://www.mtu.de/en/technologies/engineering_news/development/Zaehringer_Towards_the_Powerhouse_en.pdf, pages 3 to 4, FIG. 2).

The aforementioned non-patent document, however, only discloses the concept of an electricity generation system including electric generators driven by the high-pressure shaft and the low-pressure shaft of the compressor, respectively, to generate electricity. In other words, the aforementioned non-patent document only shows the theoretical possibility of supplying increased power while maintaining the performance, operability and surge margin of the jet engine, provided by configuring an electricity generation system to generate electricity by being driven by both the high-pressure shaft and the low-pressure shaft of the compressor; it hardly discloses how to realize the concept, technically.

SUMMARY OF THE INVENTION

An aspect of the present invention is directed to an electricity generation system comprising a first electric generator designed to generate electricity by rotation of a high-pressure shaft of a compressor constituting a jet engine, a second electric generator designed to generate electricity by rotation of a low-pressure shaft of the compressor, a power distributor for distributing power generated by the first and second electric generators among multiple loads, a first power regulation device for regulating power output of the first electric generator, a second power regulation device for regulating power output of the second electric generator, and a power control device which manipulates the first and second power regulation devices to ensure a specified amount or greater of jet engine surge margin.

An increase in power output of the first electric generator entails an increase in electricity generation torque applied to the first electric generator, and thus, an increase in load on the high-pressure shaft of the compressor of the jet engine, which may lead to a decrease in rotating speed of the high-pressure shaft. Here and hereinafter, the "electricity generation torque" means torque required to make the electric generator to operate (rotate). As the rotating speed of the high-pressure shaft of the compressor decreases, the surge margin reduces, and thus, the possibility of jet engine surge increases. In sum, increased power output of the first electric generator leads to reduced surge margin, and thus, increased possibility of jet engine surge. Conversely, a decrease in power output of the first electric generator entails a decrease in electricity generation torque applied to the first electric generator, and thus, a decrease in load on the high-pressure shaft, which may lead to an increase in rotating speed of the high-pressure shaft. As the rotating speed of the high-pressure shaft of the compressor increases, the surge margin increases, and thus, the possibility of surge decreases.

An increase in power output of the second electric generator entails an increase in electricity generation torque applied to the second electric generator, and thus, an increase in load on the low-pressure shaft of the compressor of the jet engine. The increase in load on the low-pressure shaft of the compressor, however, leads to an increase in jet engine surge margin. In sum, increased power output of the second electric generator leads to increased surge margin, and thus, decreased possibility of surge. Conversely, a decrease in power output of the second electric generator entails a decrease in electricity generation torque applied to the second electric generator, and thus, a decrease in load on the low-pressure shaft, which may lead to an increase in rotating speed of the low-pressure shaft. As the rotating speed of the low-pressure shaft of the compressor increases, the surge margin reduces, and thus, the possibility of jet engine surge increases.

Thus, by regulating the ratio between power outputs of the first and second electric generators depending on the total power consumption of the loads, it is possible to ensure a specified amount or greater of surge margin while meeting the power demands of the loads. In addition, the electricity generation system designed to generate electricity utilizing rotations of the high-pressure shaft and the low-pressure of the compressor is able to supply increased power as compared with conventional electricity generation systems designed to generate electricity only by rotation of the high-pressure shaft of the compressor.

The present invention thus provides an electricity generation system capable of supplying increased power while ensuring a specified amount or greater of jet engine surge margin.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, embodiments of the present invention will be described.

Configuration of Jet Engine

Figure 1:
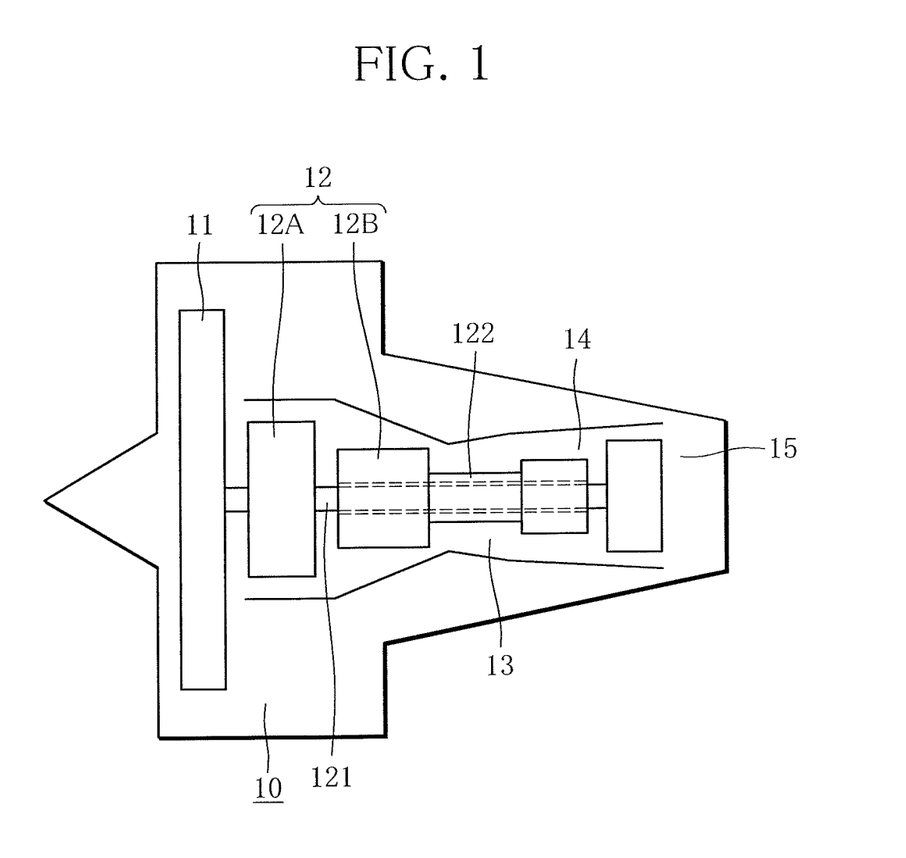
FIG. 1 is a front view schematically showing the internal configuration of a jet engine.

With reference to FIG. 1, the configuration of a jet engine will be described briefly. FIG. 1 is a front view schematically showing the internal configuration of a jet engine 10.

The jet engine 10 comprises a fan 11, a compressor 12, a combustion chamber 13, a turbine 14 and an exhaust outlet 15. Air drawn in through the fan 11 is compressed by the compressor 12. In the combustion chamber 13, the compressed air is mixed with fuel and the resulting mixture is burnt to produce high-pressure gas. The high-pressure gas is passed through the turbine 14 to rotate the turbine 14, and emitted through the exhaust outlet 15 to produce thrust. Rotation of the turbine 14 is transmitted to the compressor 12. Thus, by being driven by the turbine 14, the compressor 12 continuously draws in and compresses air.

The compressor 12 comprises a low-pressure compression part 12A and a high-pressure compression part 12B. The low-pressure compression part 12A includes a low-pressure shaft 121, multiple rows of rotor blades (not shown) and multiple rows of stator vanes (not shown). Rotation of the turbine 14 is transmitted to the low-pressure shaft 121. The rotor blades are attached to the low-pressure shaft 121, and thus, rotate with the low-pressure shaft 121. The stator vanes are attached to the casing of the jet engine 10 such that the stator vane rows alternate with the rotor blade rows. The high-pressure compression part 12B includes a high-pressure shaft 122, multiple rows of rotor blades and multiple rows of stator vanes. Rotation of the turbine 14 is transmitted to the high-pressure shaft 122. The rotor blades are attached to the high-pressure shaft 122, and thus, rotate with the high-pressure shaft 122. The stator vanes are attached to the casing of the jet engine 10 such that the stator vane rows alternate with the rotor blade rows. Air drawn into the compressor 12 experiences gradual adiabatic compression as it flows through the low-pressure compression part 12A and the high-pressure compression part 12B.

Configuration of Electricity Generation System

Figure 2:
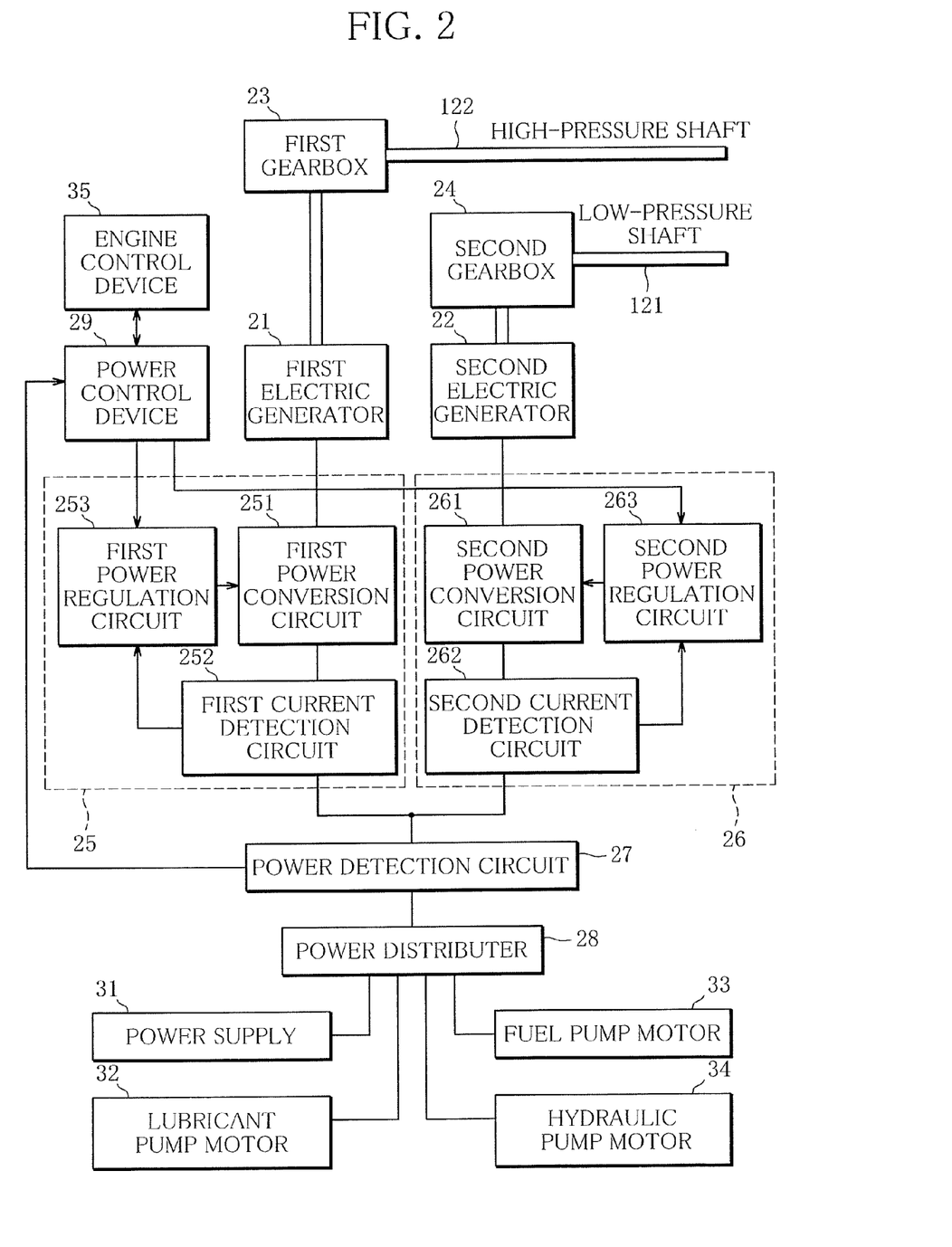
FIG. 2 is a block diagram showing the configuration of an electricity generation system according to the present invention.

With reference to FIG. 2, the electricity generation system according to the present invention will be described.

FIG. 2 is a block diagram showing the configuration of the electricity generation system according to the present invention.

The electricity generation system according to the present invention comprises a first electric generator 21, a second electric generator 22, a first gearbox 23, a second gearbox 24, a first power regulation device 25, a second power regulation device 26, a power detection circuit 27, a power distributor 28 and a power control device 29.

The first and second electric generators 21, 22 are AC generators, such as three-phase AC generators. Rotation of the high-pressure shaft 122 of the compressor 12 is transmitted to the first electric generator 12 via the first gearbox 23 so that an electricity-generating turbine thereof rotates to generate electricity. The first gearbox 23 is a power transmission which transmits power from the high-pressure shaft 122 to the first electric motor 21 at a constant gear ratio. The gear ratio of the first gearbox 23 is determined depending on the specifications of the jet engine 10, the specifications of the first electric generator 21 and others, for example. Rotation of the low-pressure shaft 121 of the compressor 12 is transmitted to the second electric generator 22 via the second gearbox 24 so that an electricity-generating turbine thereof rotates to generate electricity. The second gearbox 24 is a power transmission which transmits power from the low-pressure shaft 121 to the second electric motor 22 at a constant gear ratio. The gear ratio of the second gearbox 24 is determined depending on the specifications of the jet engine 10, the specifications of the second electric generator 22 and others, for example.

The first power regulation device 25 is a device for regulating the power output of the first electric generator 21, and includes a first power conversion circuit 251, a first current detection circuit 252 and a first power regulation circuit 253.

The first power conversion circuit 251 includes a converter (not shown) for changing AC generated by the first electric generator 21 to DC, and an inverter (not shown) for changing the DC generated by the converter to AC. The converter is, for example a known power conversion circuit including a rectifier circuit, a chopper circuit, and a chopper circuit driver, and changes AC to DC at a desired voltage. The inverter is, for example a known power conversion circuit including a semiconductor switch and a semiconductor switch drive circuit, and changes DC to AC at a desired voltage and frequency. The first current detection circuit 252 is, for example a known AC detection circuit including a current transformer and a Hall element, and detects the AC delivered from the first power conversion circuit 251. The first power regulation circuit 253 is a known microcomputer-controlled circuit and regulates the power output of the first electric generator 21 by manipulating the first power conversion circuit 251 depending on a current value detected by the first current detection circuit 252.

The second power regulation device 26 is a device for regulating the power output of the second electric generator 22, and includes a second power conversion circuit 262, a second current detection circuit 262 and a second power regulation circuit 263.

The second power conversion circuit 261 includes a converter (not shown) for changing AC generated by the second electric generator 22 to DC, and an inverter (not shown) for changing the DC generated by the converter to AC, as is the case with the first power conversion circuit 251. The second current detection circuit 262 is, for example a known AC detection circuit including a current transformer and a Hall element, as is the case with the first current detection circuit 252, and detects the AC delivered from the second power conversion circuit 261. The second power regulation circuit 263 is a known microcomputer-controlled circuit, as is the case with the first power regulation circuit 253, and regulates the power output of the second electric generator 22 by manipulating the second power conversion circuit 261 depending on a current value detected by the second current detection circuit 262.

The power detection circuit 27 detects the respective power outputs of the first and second electric generators 21, 22, and transmits the sum of detected values to the power control device 29. The power distributer 28 distributes the power generated by the first and second electric generators 21, 22 among multiple loads. The power control device 29 is a known microcomputer-controlled circuit and manipulates the first and second power regulation devices 25, 26.

The loads are a power supply 31, a lubricant pump motor 32, a fuel pump motor 33, and a hydraulic pump motor 34. The power supply 31 supplies power to electronic equipment in the cockpit, air conditioning equipment for the cabin, lighting facilities, a power source for the jet engine 10 and others in the aircraft equipped with the jet engine 10. The lubricant pump motor 32 is an electric motor driving a lubricant pump for the jet engine 10. The fuel pump motor 33 is an electric motor driving a fuel pump for the jet engine 10. The hydraulic pump motor 34 is an electric motor driving a hydraulic pump for the jet engine 10. An engine control device 35 is a device for controlling the rotating speed and others of the jet engine 10 and exchanging data with the power control device 29. It is, for example a FADEC (full authority digital electronics control) which is a known aircraft engine control device.

Power Control in the Electricity Generation System

Figure 3:
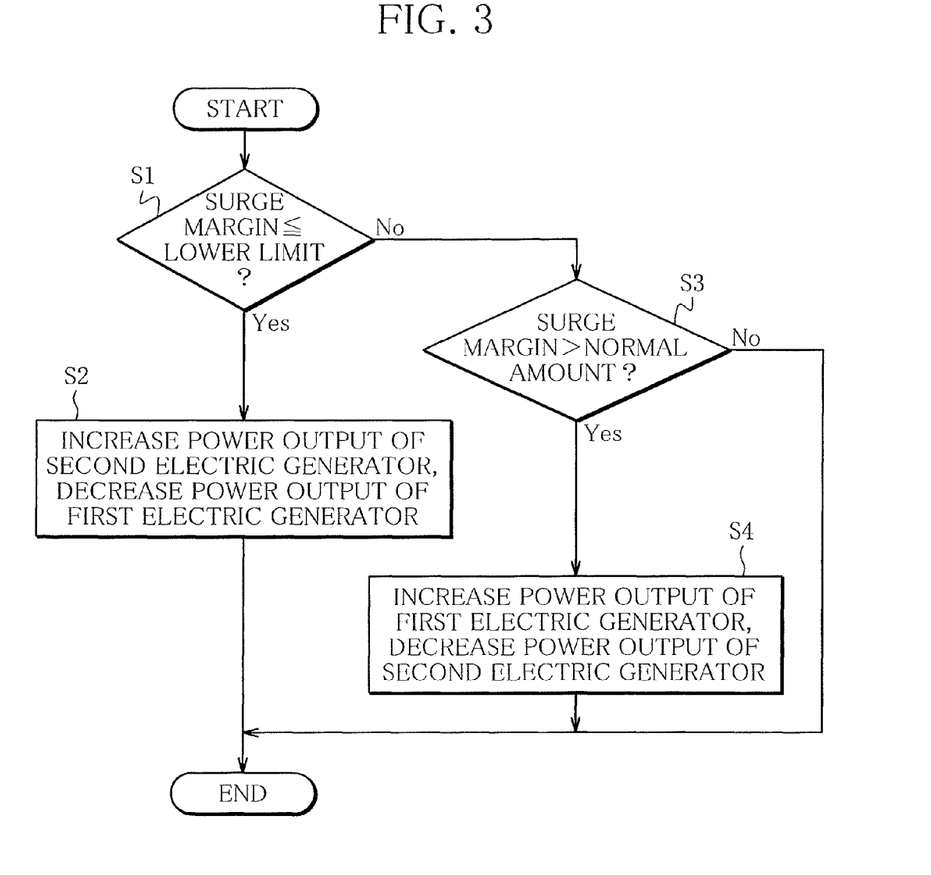
FIG. 3 is a flow chart showing a procedure for regulating power outputs of first and second electric generators.
Figure 4:
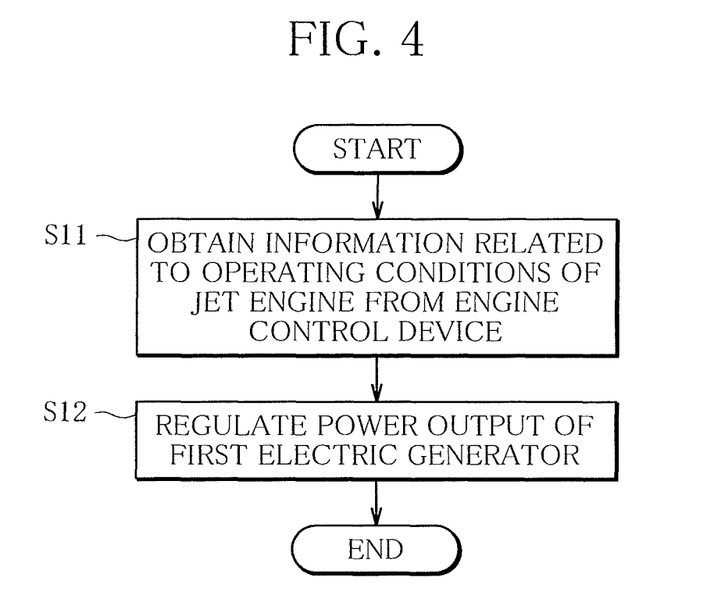
FIG. 4 is a flow chart showing a procedure for regulating power output of the first electric generator.
Figure 5:
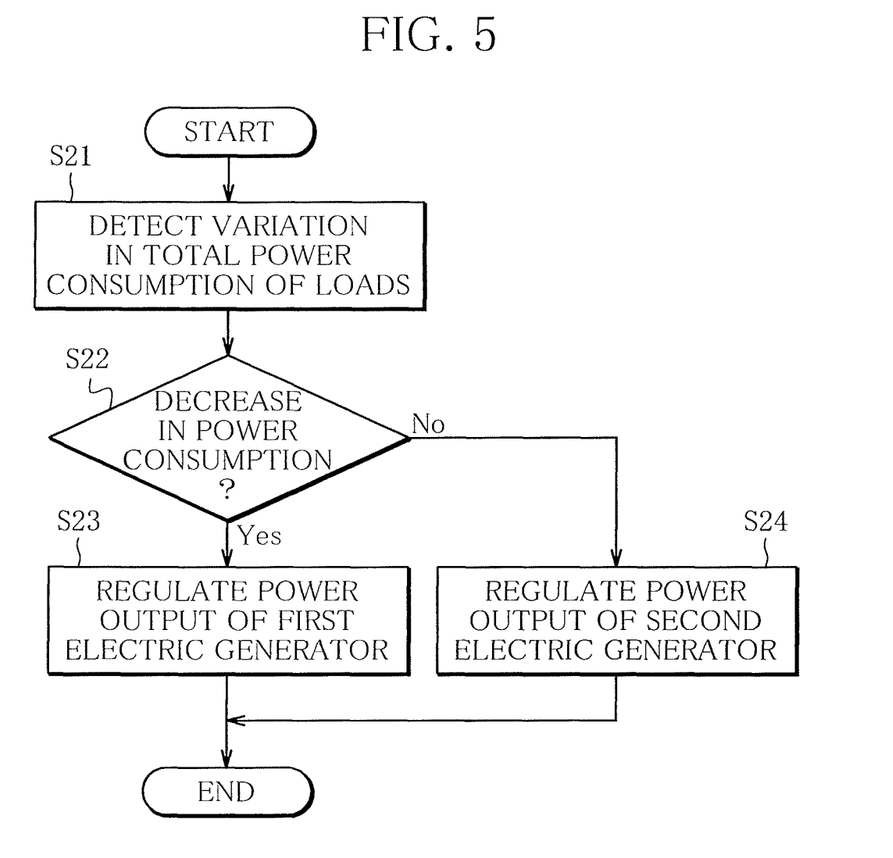
FIG. 5 is a flow chart showing a procedure for regulating power outputs of the first and second electric generators.

With reference to FIGS. 3 to 5, power control in the electricity generation system according to the present invention will be described.

An increase in power output of the first electric generator 21 entails an increase in electricity generation torque applied to the first electric generator 21, and thus, an increase in load on the high-pressure shaft 122 of the compressor 12 of the jet engine 10, which may lead to a decrease in rotating speed of the high-pressure shaft 122. As the rotating speed of the high-pressure shaft 122 of the compressor 12 decreases, the surge margin reduces, and thus, the possibility of jet engine 10 surge increases. In sum, increased power output of the first electric generator 21 leads to reduced surge margin, and thus, increased possibility of jet engine 10 surge.

An increase in power output of the second electric generator 22 entails an increase in electricity generation torque applied to the second electric generator 22, and thus, an increase in load on the low-pressure shaft 121 of the compressor 12 of the jet engine 10. The increase in load on the low-pressure shaft 121 of the compressor 12, however, leads to an increase in jet engine 10 surge margin. In sum, increased power output of the second electric generator 22 leads to increased surge margin, and thus, decreased possibility of jet engine 10 surge.

FIG. 3 is a flow chart showing a procedure for regulating the power outputs of the first and second electric generators 21, 22. The procedure shown is performed by the power control device 29 at regular intervals.

The power control device 29 calculates a total electricity generation torque required, from the total power consumption of the loads, detected by the power detection circuit 27, power loss in the electric system, electrical characteristics of the first and second electric motors 21, 22 and others. The total electricity generation torque required is a torque required to generate power corresponding to the total power consumption, and thus, the sum of electricity generation torques required to be applied to the first and second electric generators 21, 22. The power control device 29 also calculates a surge margin on the basis of the total electricity generation torque required, operating conditions of the jet engine 10, flight conditions of the aircraft and the like, obtained from the engine control device 35. Then, the power control device 29 manipulates the first and second power regulation devices 25, 26 to ensure a specified amount or greater of jet engine 10 surge margin.

More specifically, the power control device 29 sets a normal amount and a lower limit of surge margin in advance, and determines whether or not the surge margin is smaller than or equal to the lower limit (step S1). If the surge margin is smaller than or equal to the lower limit ("Yes" at step S1), the power control device 29 increases power output of the second electric generator 22 and decreases power output of the first electric generator 21 correspondingly (step S2), thereby increasing the surge margin. If the surge margin is greater than the lower limit ("No" at step S1), the power control device 29 then determines whether the surge margin is greater than the normal amount (step S3). If the surge margin is greater than the normal amount ("Yes" at step S3), the power control device 29 increases power output of the first electric generator 21 and decreases power output of the second generator 22 correspondingly (step S4), thereby reducing the surge margin. If the surge margin is smaller than or equal to the normal amount ("No" at step S4), the power control device 29 ends the procedure at that step.

By regulating the ratio between power outputs of the first and second electric generators 21, 22 as described above, it is possible to ensure a specified amount(lower limit) or greater of surge margin while meeting power demands of the loads. In addition, the electricity generation system designed to generate electricity utilizing rotations of the high-pressure shaft 122 and the low-pressure shaft 121 of the compressor 12 is able to supply increased power as compared with conventional electricity generation systems designed to generate electricity only by rotation of the high-pressure shaft of the compressor.

As stated above, an increase in power output the first electric generator 21 entails an increase in electricity generation torque applied to the first electric generator 21, which leads to a reduction in surge margin. Thus, provided that the relationship between electricity generation torque applied to the first electric generator 21 and surge margin is obtained in advance, the ratio between the power outputs of the first and second electric generators 21, 22 can be regulated so that the electricity generation torque applied to the first electric generator 21 will not exceed a magnitude ensuring a desired amount of surge margin.

The present invention thus provides an electricity generation system capable of generating increased power while ensuring a specified amount or greater of jet engine 10 surge margin.

FIG. 4 shows a flow chart showing a procedure for regulating the power output of the first electric generator 21, and FIG. 5 is a flow chart showing a procedure for regulating the power outputs of the first and second electric generators 21, 22. The procedures shown in FIGS. 4 and 5 are performed by the power control device 29 at regular intervals.

Mostly, variations in the operating conditions of the jet engine 10, the flight conditions of the aircraft and the like cause the power consumption to vary slowly with relatively long cycles. Thus, although not indispensable to the present invention, it is desirable that the electricity generation system be designed to regulate the power output of the first electric generator 21 depending on the operating conditions of the jet engine 10, the flight conditions of the aircraft or the like. This makes it possible to handle variations in power consumption caused by variations in the operating conditions of the jet engine, the flight conditions of the aircraft or the like while maintaining stable operation of the jet engine 10.

Specifically, the power control device 29 obtains information such as the operating conditions of the jet engine 10 or the flight conditions of the aircraft from the engine control device 35 (step S11 in FIG. 4) and regulates the power output of the first electric generator 21 by manipulating the first power regulation device 25 on the basis of the information obtained (step S12 in FIG. 4). Steady or slow and relatively-long cycle variations in power demand are thus handled mainly by the first electric generator 21.

By contrast, the power consumption of the air-conditioning equipment for the cabin of the aircraft, for example, can greatly vary instantaneously, resulting in a great instantaneous variation in total power consumption of the loads. An instantaneous increase in power output of the first electric generator 21 entails an abrupt increase in electricity generation torque applied to the first electric generator 21, and thus, an increase in load on the high-pressure shaft 122 of the compressor 12, which may lead to unstable operation of the compressor 12, and thus, of the jet engine 10. By contrast, an instantaneous increase in power output of the second electric generator 22 entails an increase in electricity generation torque applied to the second electric generator 22, and thus, an increase in load on the low-pressure shaft 121 of the compressor 12; the increase in load on the low-pressure shaft 121 of the compressor 12, however, contributes to safer operation of the jet engine 10.

An instantaneous decrease in power output of the second electric generator 22 entails an abrupt decrease in electricity generation torque applied to the second electric generator 22, and thus, a decrease in load on the low-pressure shaft 121 of the compressor 12, which may lead to unstable operation of the compressor 12, and thus, of the jet engine 10. By contrast, an instantaneous decrease in power output of the first electric generator 21, entails a decrease in electricity generation torque applied to the first electric generator 21, and thus, a decrease in load on the high-pressure shaft 122 of the compressor 12; the decrease in load on the high-pressure shaft 122 of the compressor 12, however, contributes to safer operation of the jet engine 10.

Thus, although not indispensable to the present invention, it is desirable that the electricity generation system be designed to regulate the power output of the first electric generator 21 depending on a decrease in total power consumption of the loads, and regulate the power output of the second electric generator 22 depending on an increase in total power consumption of the loads. This makes it possible to handle instantaneous variations in power demand while maintaining stable operation of the jet engine 10.

More specifically, the power control device 29 detects a variation in total power consumption of the loads (step S21 in FIG. 5) and determines whether the variation detected is a decrease in total power consumption (step S22 in FIG. 5). If the variation detected is a decrease in total power consumption ("Yes" at step S22 in FIG. 5), the power control device 29 regulates the power output of the first electric generator 21 by manipulating the first power regulation device 25 depending on the decrease in total power consumption (step S23 in FIG. 5). If the variation detected is an increase in total power consumption ("No" at step S22 in FIG. 5), the power control device 29 regulates the power output of the second electric generator 22 by manipulating the second power regulation device 26 depending on the increase in total power consumption (step S24 in FIG. 5). Thus, an instantaneous decrease in power demand is handled mainly by the first electric generator 21, while an instantaneous increase in power demand is handled mainly by the second electric generator 22. This reduces the possibility that a great instantaneous variation in total power consumption of the loads makes the operation of the jet engine 10 unstable.

Other Embodiments, Variants

For example, an increase in total power consumption of the loads reduces the compressor 12's compression capacity, resulting in a decrease in rotating speed of the jet engine 10. In this case, the rotating speed of the jet engine 10 can be increased by increasing the flow rate at which fuel is supplied to the jet engine 10, for example. However, because of inertia of mechanical components and other reasons, there is commonly a time lag between regulation (increase or decrease) of the fuel flow rate and change in rotating speed of the jet engine 10. It follows that when increasing the fuel flow rate after detecting a decrease in rotating speed of the jet engine 10, the jet engine 10 continues rotating at decreased speed for a period of time corresponding to the time lag.

Taking the above into consideration, it is desirable that the electricity generation system of the present invention be designed such that the power control device 29 transmits information related to total power consumption of the loads to the engine control device 35. This, for example allows the engine control device 35 to take an action, such as increasing the fuel flow rate, on the basis of the information received, before an increase in total power consumption causes a decrease in rotating speed of the jet engine. This reduces the possibility that variations in total power consumption lead to variations in rotating speed of the jet engine 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electricity generation system comprising:
   a first electric generator designed to generate electricity by rotation of a high-pressure shaft of a compressor constituting a jet engine,
   a second electric generator designed to generate electricity by rotation of a low-pressure shaft of the compressor,
   a power distributor for distributing power generated by the first and second electric generators among multiple loads,
   a first power regulation device for regulating power output of the first electric generator,
   a second power regulation device for regulating power output of the second electric generator, and
   a power control device which manipulates the first and second power regulation devices such that a ratio between the power outputs of the first and second electric generators is regulated depending on a total power consumption of the loads to ensure a specified amount or greater of jet engine surge margin, wherein the power control device includes:
      means for manipulating the first power regulation device depending on a decrease in total power consumption of the loads, and
      means for manipulating the second power regulation device depending on an increase in total power consumption of the loads.

2. The electricity generation system according to claim 1, wherein
   the power control device includes means for manipulating the first power regulation device depending on operating conditions of the jet engine or flight conditions of an aircraft equipped with the jet engine.

3. The electricity generation system according to claim 1, wherein
   the power control device includes means for transmitting information related to total power consumption of the loads to an engine control device for controlling rotating speed of the jet engine.

4. The electricity generation system according to claim 1, wherein
   the loads include a fuel pump, a hydraulic pump and a lubricant pump constituting the jet engine.

5. An electricity generation system comprising:
a first electric generator adapted to generate electricity by rotation of a high-pressure shaft of a compressor constituting a jet engine;
a second electric generator adapted to generate electricity by rotation of a low-pressure shaft of the compressor;
a power distributor for distributing electricity generated by the first and second electric generators among multiple loads;
a first power regulation device for regulating power output of the first electric generator;
a second power regulation device for regulating power output of the second electric generator; and
a power control device adapted to manipulate the first and second power regulation devices such that a ratio between the power outputs of the first and the second electric generators is regulated according to a total power consumption of the loads to ensure at least a specified amount of surge margin of the jet engine, wherein the power control device includes:
means for setting a normal amount and a lower limit of the surge margin in advance and determining whether a present surge margin is less than or equal to the lower limit,
means for increasing the power output of the second electric generator and decreasing output of the first electric generator upon the present surge margin being less than or equal to the lower limit,
means for determining whether the present surge margin is greater than the normal amount if the present surge margin is greater than the lower limit, and
means for increasing the power output of the first electric generator and decreasing the power output of the second electric generator if the present surge margin is greater than the normal amount.

6. The electricity generation system of claim 5, wherein the power control device further includes means for transmitting information relating to the total power consumption of the loads to an engine control device for controlling a rotating speed of the jet engine.

7. The electricity generation system of claim 5, wherein the loads include a fuel pump, a hydraulic pump, and a lubricant pump.

* * * * *